(12) United States Patent
Yuan et al.

(10) Patent No.: US 11,726,309 B2
(45) Date of Patent: Aug. 15, 2023

(54) ILLUMINATION SYSTEM FOR STED OPTICAL MICROSCOPE AND STED OPTICAL MICROSCOPE

(71) Applicant: INSTITUTE OF CHEMISTRY CHINESE ACADEMY OF SCIENCES, Beijing (CN)

(72) Inventors: Jinghe Yuan, Beijing (CN); Jianqiang Yu, Beijing (CN); Xiaohong Fang, Beijing (CN)

(73) Assignee: Institute of Chemistry Chinese Academy of Sciences, Beijing (CN)

( * ) Notice: Subject to any disclaimer, the term of this patent is extended or adjusted under 35 U.S.C. 154(b) by 556 days.

(21) Appl. No.: 17/043,615

(22) PCT Filed: Dec. 14, 2018

(86) PCT No.: PCT/CN2018/121206
§ 371 (c)(1),
(2) Date: Sep. 29, 2020

(87) PCT Pub. No.: WO2020/062609
PCT Pub. Date: Apr. 2, 2020

(65) Prior Publication Data
US 2021/0018736 A1    Jan. 21, 2021

(30) Foreign Application Priority Data
Sep. 26, 2018    (CN) .......................... 201811125387.8

(51) Int. Cl.
*G02B 21/00*    (2006.01)
(52) U.S. Cl.
CPC ..... *G02B 21/0032* (2013.01); *G02B 21/0076* (2013.01)

(58) Field of Classification Search
CPC ............ G02B 21/0032; G02B 21/0076; G02B 27/58; G02B 21/06; G02B 27/00;
(Continued)

(56) References Cited

U.S. PATENT DOCUMENTS 9,766,180 B2 *    9/2017    Wuite ................... G02B 21/16
9,880,377 B1 *    1/2018    Safrani ................. G02B 21/22
(Continued)

FOREIGN PATENT DOCUMENTS

CN    102455500 A    5/2012
CN    102540439 A    7/2012
(Continued)

OTHER PUBLICATIONS

Office Action for JP Application No. 2020-551913, dated Sep. 27, 2021.
(Continued)

*Primary Examiner* — Mustak Choudhury
(74) *Attorney, Agent, or Firm* — NKL Law; Allen Xue

(57) ABSTRACT

An illumination system for a STED optical microscope includes an illumination light path consisting of an illumination light source and an optical elements. The illumination light path includes a first light filter, a second light filter, a polarizing light splitter, a first quarter wave plate, a first dichroic element, a light path delay unit, a phase plate, a second dichroic element, and a second quarter wave plate arranged in sequence along the transmission direction of the light path. The light beam emitted from the illumination light source is divided into two coaxial light beams after transmitted by the illumination light path. A first light beam is incident to a microscope objective to form a first light spot, a second light beam is incident to the microscope objective to form a second light spot, and the center of the first light spot coincides with that of the second light spot.

10 Claims, 3 Drawing Sheets

(58) Field of Classification Search
CPC .. G02B 27/10; G02B 27/1006; G02B 27/106; G02B 26/0808; G02B 26/0816
See application file for complete search history.

(56) References Cited

U.S. PATENT DOCUMENTS

| | | | | |
|---|---|---|---|---|
| 11,194,144 | B2* | 12/2021 | Netz | G01N 21/6458 |
| 2010/0142054 | A1* | 6/2010 | Kastrup | G02B 21/0076 |
| | | | | 359/579 |
| 2014/0321772 | A1* | 10/2014 | Piche | G06T 3/4053 |
| | | | | 382/284 |
| 2015/0226950 | A1* | 8/2015 | Booth | G01N 21/636 |
| | | | | 250/459.1 |
| 2016/0305883 | A1* | 10/2016 | Betzig | G02B 21/16 |

FOREIGN PATENT DOCUMENTS

| | | |
|---|---|---|
| CN | 103257130 A | 8/2013 |
| CN | 103616330 A | 3/2014 |
| CN | 106841149 A | 6/2017 |
| CN | 107329245 A | 11/2017 |
| CN | 108121059 A | 6/2018 |
| CN | 108957720 A | 12/2018 |
| EP | 2158475 B1 | 7/2016 |
| JP | 2003167198 A | 6/2003 |
| JP | 2003262798 A | 9/2006 |
| JP | 2013061255 A | 4/2013 |
| JP | 2013200257 A | 10/2013 |
| JP | 2015072462 A | 4/2015 |
| WO | 2017174100 A1 | 10/2017 |

OTHER PUBLICATIONS

Chen, Wenxia et al.; Breaking Through the diffraction limit of far-field Optical microscopy by stimulated emission depletion (STED); Laser & Optoelectronics Progress; vol. 42, No. 10, Oct. 2005.

Yu, Jianqiang et al.; Principle and Progress of Experimental Setup on Stimulated Emission Depletion Fluorescence Microscope; Laser & Optoelectronics Progress; 49, 120001(2012); Oct. 19, 2012.

Pikov, Victor et al.; Raman spectrometer system for remote measurement of cellular temperature on a microscopic scale; IEEE Engineering in Medicine and Biology Magazine; 0739-5175/10/2010IEEE; Jan./Feb. 2010 p. 63-p. 71.

* cited by examiner

ILLUMINATION SYSTEM FOR STED OPTICAL MICROSCOPE AND STED OPTICAL MICROSCOPE

TECHNICAL FIELD

The present disclosure relates to the technical field of microscopic imaging, and in particular to an illumination system for a STED optical microscope, and a STED optical microscope.

BACKGROUND

Nowadays, about 80% of microscopic imaging research in life sciences still uses optical microscopes. It can be said that the progress of life sciences is accompanied by the development of optical microscopes. However, due to the existence of optical diffraction limit, the spatial resolution of the optical microscope is limited to about half a wavelength. Such a resolution seriously hinders a detailed study of subcellular structures by biologists. A stimulated emission depletion (STED) microscope uses a beam of STED light to form a shell-shaped light spot, so that fluorescent molecules around an excitation light diffracted light spot are converted into a non-spontaneous-emission state through stimulated emission depletion, thereby achieving a spatial resolution superior to 50 nm. Due to the plenoptic configuration, the image acquisition time is the same as that of a traditional confocal microscope, and there are no special requirements on sample preparation, so real-time imaging and dynamic tracking of the subcellular structures in living cells can be achieved.

Since the invention of super-resolution STED fluorescence microscope, it has been widely used in scientific research of biology and life medicine. However, in practical applications, the structure of the STED microscope is complicated, and it is difficult to achieve high-precision and long-time stable alignment (nanometer-level) of the excitation light spot and the STED shell-shaped light spot.

SUMMARY

An object of the present disclosure is to at least solve one of the above-mentioned defects and shortcomings, and the object is achieved through the following technical solutions.

The present disclosure provides an illumination system for a STED optical microscope, which includes an illumination light source, and an illumination light path composed of optical elements; after passing through the illumination light path, a light beam emitted from the illumination light source is focused and irradiated onto a sample to excite fluorescent substance in the sample to emit fluorescence; the illumination light path includes a first optical filter, a second optical filter, a polarization beam splitter, a first quarter-wave plate, a first dichroic element, an optical path delay unit, a phase plate, a second dichroic element and a second quarter-wave plate, which are arranged in sequence in a transmission direction of the light path; after the light beam emitted from the illumination light source is optically filtered by the first optical filter and the second optical filter, a first light beam and a second light beam each having a certain wavelength are obtained; the first light beam and the second light beam are respectively split by the polarization beam splitter to form linearly polarized lights which, after being reflected, are incident onto the first quarter-wave plate and the first dichroic element in sequence; the first light beam forms circularly polarized light after passing through the first quarter-wave plate, and after being reflected by the first dichroic element, it passes through the first quarter-wave plate again to form linearly polarized light, which is then transmitted through the polarization beam splitter, reflected by the second dichroic element, and converted by the second quarter-wave plate into circularly polarized light to be incident onto a microscopic objective lens of a microscopic imaging system and converged, thus forming a first light spot at a focal plane of the microscopic objective lens; the second light beam forms circularly polarized light after passing through the first quarter-wave plate, and after being transmitted through the first dichroic element, it is incident onto the optical path delay unit and the phase plate; after being reflected by the phase plate, the second light beam is sequentially exited from the optical path delay unit, transmitted through the first dichroic element, converted by the first quarter-wave plate into linearly polarized light, transmitted through the polarization beam splitter, reflected by the second dichroic element, converted by the second quarter-wave plate into circularly polarized light, and incident onto the microscopic objective lens of the microscopic imaging system and converged, thus forming a second light spot at the focal plane of the microscopic objective lens, wherein a center of the first light spot coincides with a center of the second light spot.

Further, the first light beam is excitation light, and the first light spot is a solid light spot; the second light beam is depletion light relative to the first light beam, and the second light spot is a hollow light spot.

Further, the first optical filter is a neutral optical filter configured to adjust an intensity of a total laser light emitted from illumination light source; the second optical filter is a dual-band-pass optical filter configured to filter out the first light beam and the second light beam each having the certain wavelength, and adjust an intensity of the first light beam and an intensity of the second light beam, wherein the first optical filter and the second optical filter are arranged coaxially along the light path.

Further, the first quarter-wave plate is capable of converting the incident first light beam and second light beam from linearly polarized light into circularly polarized light, and is also capable of converting the incident first light beam and second light beam from circularly polarized light into linearly polarized light; the second quarter-wave plate is capable of converting linearly polarized light into circularly polarized light.

Further, the first dichroic element is a selective transmission medium film, the medium film is plated on an incident end of the optical path delay unit, and the medium film is capable of reflecting the incident first light beam and is capable of transmitting the incident second light beam; the second dichroic element is a dichroic sheet, and the dichroic sheet is capable of reflecting both the incident first light beam and second light beam and is capable of transmitting the fluorescence emitted from the sample.

Further, the optical path delay unit is capable of causing optical delay in the second light beam.

Further, the phase plate is a reflective phase plate, which is arranged at a distal end of the optical path delay unit; the second light beam enters the optical path delay unit and is then incident onto the phase plate; after being reflected, the second light beam can return to an incident end of the optical path delay unit along the original light path; in addition, the phase plate is capable of modulating a wavefront of the incident second light beam.

Further, a beam expander for expanding and shaping the light beam emitted from the illumination light source is further provided between the illumination light source and the first optical filter.

The present disclosure also provides a STED optical microscope including the illumination system for a STED optical microscope described above. The STED optical microscope further includes a microscopic imaging system and a fluorescence detection system, and the microscopic imaging system includes a microscopic objective lens; after passing through an illumination light path of the illumination system, a light beam emitted from the illumination light source is divided into two coaxial light beams, i.e., a first light beam and a second light beam; the first light beam and the second light beam are respectively converged by the microscopic objective lens and then irradiated onto a sample to excite fluorescent substance in the sample to emit fluorescence; the fluorescence enters the fluorescence detection system for detection after being converged by the microscopic objective lens; an optical axis of the first light beam and an optical axis of the second light beam are both coaxial with an optical axis of a detection light path of the fluorescence detection system.

Further, a third optical filter for filtering the fluorescence is provided between an exit end of the microscopic imaging system and the fluorescence detection system.

The present disclosure has the following advantages:

(1) Through an integrated design, the illumination system for the STED optical microscope provided by the present disclosure avoids a physical adjustment of the mutual geometric relationship between unit devices and an inherent temperature and vibration instability of a mechanical adjustment mechanism, so that the STED instrument can work reliably for a long time in various environments.

(2) Through optical cold processing and optical coating, the present disclosure can filter out excitation light and depletion light of suitable wavelengths from a laser light source. The optical coating also realizes the regulation of a relative intensity of the excitation light and the depletion light, and the neutral optical filter realizes the regulation of a total light intensity.

(3) The present disclosure uses a combination of polarization beam splitter and wave plates to make the light path compact, which is advantageous for achieving beam steering and beam polarization state control with fewer optical elements; moreover, the present disclosure enables various main optical elements to be combined into an integrated module by being bonded at end faces, which makes the device insensitive to temperature and environmental vibration while reducing the volumes of the devices, and improves the reliability.

(4) In the present disclosure, a phase plate is processed on the optical path delay unit through a binary optical processing technology to perform reflective phase control of the depletion light, which can produce a phase modulated beam with a certain time delay, which is strictly concentric with the excitation light and which is critical in the STED technology (the depletion light is converged by the objective lens to form the shell-shaped light spot).

BRIEF DESCRIPTION OF THE DRAWINGS

Upon reading a detailed description of the preferred embodiments below, various other advantages and benefits will become clear to those skilled in the art. The drawings are only for the purpose of illustrating the preferred embodiments, and should not be considered as limiting the present disclosure. Moreover, identical parts are denoted by identical reference signs throughout the drawings. In the drawings.

REFERENCE SIGNS IN THE DRAWINGS ARE AS FOLLOWS

Figure 1:
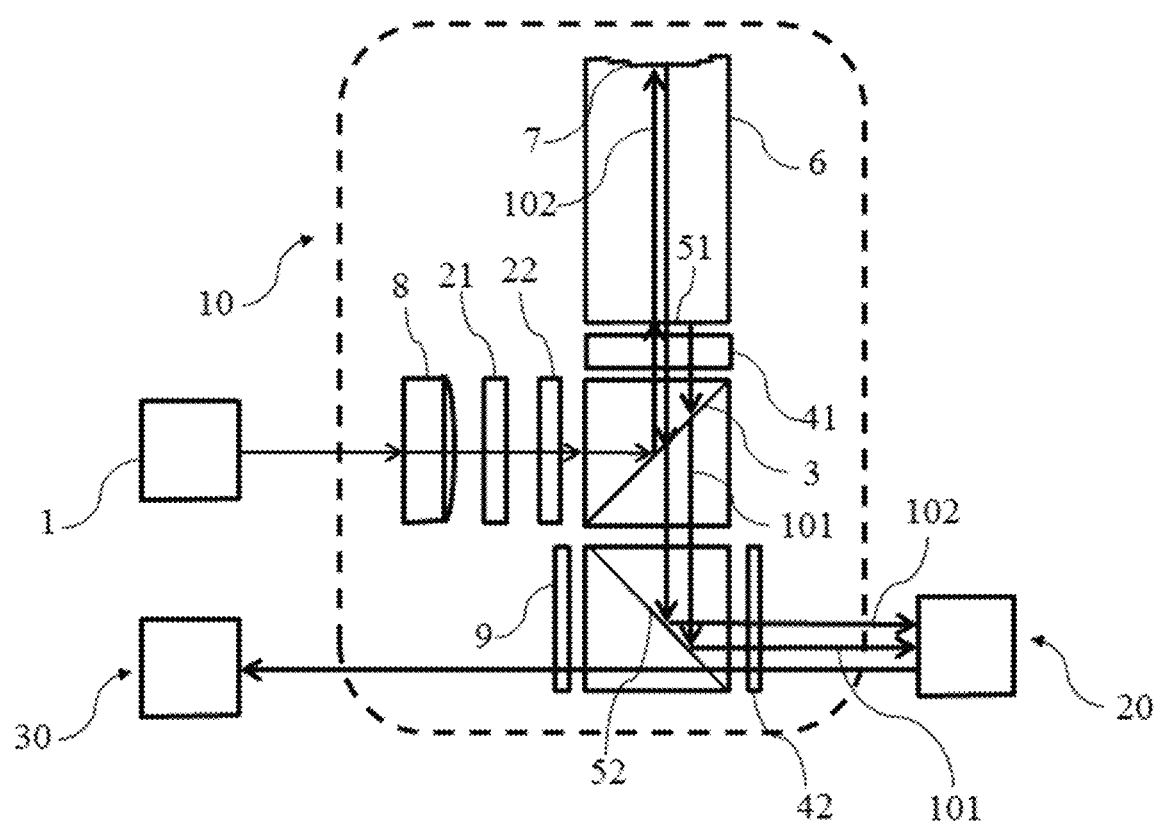
FIG. 1 is a schematic structural view of an illumination system for a STED optical microscope provided by an embodiment of the present disclosure.

10: illumination system; 20: microscopic imaging system;
30: fluorescence detection system; 1: laser;
21: first optical filter; 22: second optical filter;
3: polarization beam splitter; 41: first quarter-wave plate;
42: second quarter-wave plate; 51: first dichroic element;
52: second dichroic element; 6: optical path delay unit;
7: phase plate; 8: beam expander;
9: third optical filter; 101: first light beam;
102: second light beam.

DETAILED DESCRIPTION

Hereinafter, exemplary embodiments of the present disclosure will be described in more detail with reference to the accompanying drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

FIG. 1 shows a schematic structural view of an illumination system for a STED optical microscope provided by an embodiment of the present disclosure. The illumination system is suitable for a STED optical microscope which includes an illumination system 10, a microscopic imaging system 20, and a fluorescence detection system 30. A light beam emitted from the illumination system 10 is focused by a microscopic objective lens of the microscopic imaging system 20 and then irradiated onto a sample to excite fluorescent substance in the sample to emit fluorescence, and the fluorescence of the sample is converged by the microscopic objective lens and then incident onto the fluorescence detection system 30 for detection.

As shown in FIG. 1, the illumination system for the STED optical microscope provided by the present disclosure includes an illumination light source, and an illumination light path composed of optical elements. In this embodiment, the illumination light source is a laser 1, which is capable of emitting a multi-wavelength laser light or a combination of multiple laser lights. After passing through the illumination light path, a laser light beam emitted from the laser 1 is focused and irradiated onto a sample; the illumination light path includes a first optical filter 21, a second optical filter 22, a polarization beam splitter 3, a first quarter-wave plate 41, a first dichroic element 51, an optical path delay unit 6, a phase plate 7, a second dichroic element 52 and a second quarter-wave plate 42, which are arranged in sequence in a transmission direction of the light path; after the light beam emitted from the illumination light source 1 is optically filtered by the first optical filter 21 and the second optical filter 22, two beams of light, i.e., a first light beam 101 and a second light beam 102 are obtained; the first light beam 101 and the second light beam 102 are respectively split by the polarization beam splitter 3 and then incident onto the first quarter-wave plate 41 to produce circularly polarized light which is then incident onto the first dichroic element 51. After being reflected, the first light beam 101 incident onto the first dichroic element 51 sequentially passes through the first quarter-wave plate 41 to produce linearly polarized light, is transmitted through the polarization beam splitter 3, reflected by the second dichroic element 52, and converted by the second quarter-wave plate 42 into circularly polarized light to be incident onto the microscopic objective lens and converged, thus forming a first light spot at a focal plane of the objective lens; after being transmitted, the second light beam 102 incident onto the first dichroic element 51 is incident onto the optical path delay unit 6 to produce optical delay; after being reflected by the phase plate 7 arranged at a distal end of the optical path delay unit 6, the second light beam 102 is sequentially exited from the optical path delay unit 6, transmitted through the first dichroic element 51 and the first quarter-wave plate 41 to produce linearly polarized light, transmitted through the polarization beam splitter 3, reflected by the second dichroic element 52, and converted by the second quarter-wave plate 42 into circularly polarized light, which is also incident onto the microscopic objective lens and converged, thus forming a second light spot at the focal plane of the objective lens, wherein a center of the first light spot coincides with a center of the second light spot. In FIG. 1, for the sake of clarity, the first beam 101 and the second beam 102 are vertically shifted; generally, in practice, the beams should be strictly coaxial to the greatest extent possible.

The first light beam 101 is excitation light, which is used to excite fluorescence and perform fluorescence imaging on the sample; the second light beam 102 is depletion light relative to the first light beam 101, which is used to suppress fluorescence, and de-excite the fluorescent substance in the fluorescence emission state at a peripheral area of the first light spot so that the peripheral area no longer produces fluorescence.

The first optical filter 21 is a neutral optical filter, and the first optical filter 21 can optically filter the light beam and adjust the intensity of the total laser light emitted from the illumination light source 1; the second optical filter 22 is a dual-band-pass optical filter, which is configured to optically filter out the first light beam 101 and the second light beam 102 of suitable wavelengths, and adjust the intensities of the two light beams. In a preferred embodiment, optical coating is applied to the second optical filter 22 to regulate the relative intensity of the excitation light and the depletion light.

A beam expander 8 is provided between the laser 1 and the first optical filter 21, and the beam expander 8 can expand and shape the laser beam. The first optical filter 21 and the second optical filter 22 are arranged coaxially along the light path and coincide with an optical axis of the laser 1; an axis line of the beam expander 8 also coincides with the optical axis of the laser 1.

The polarization beam splitter 3 can separate the incident light into two beams of linearly polarized light, polarization directions of which are perpendicular to each other, and which are reflected and transmitted respectively. The first light beam 101 and the second light beam 102 respectively pass through the polarization beam splitter 3 to form linearly polarized lights, wherein a P-polarized beam is discarded after being transmitted, and an S-polarized beam is reflected and then incident onto the first quarter-wave plate 41 and the first dichroic element 51 in sequence.

The first quarter-wave plate 41 and the second quarter-wave plate 42 are configured to adjust polarization states of the light beams. The first quarter-wave plate 41 is capable of converting the incident first light beam 101 and second light beam 102 from linearly polarized light into circularly polarized light, and is also capable of converting the incident first light beam 101 and second light beam 102 from circularly polarized light into linearly polarized light; the second quarter-wave plate is capable of converting the first light beam 101 and the second light beam 102 from linearly polarized light into circularly polarized light.

The first dichroic element 51 is a selective transmission medium film that can reflect the incident first light beam 101 and can transmit the second light beam 102. The second dichroic element 52 is a selective transmission dichroic sheet, which can reflect both the incident first light beam 101 and second light beam 102 and transmit the fluorescence emitted from the sample. In a preferred embodiment, the medium film of the first dichroic element 51 is plated on a surface of an incident end of the optical path delay unit 6, which not only can reduce the volume of the entire light path system and make the arrangement of optical elements more reasonable and compact, but also can reduce the influence of environmental factors such as temperature and vibration on the microscope.

The optical path delay unit 6 is an optical glass having two ends strictly parallel with each other, and its length can be designed according to actual needs so as to generate the first light beam 101 and the second light beam 102 with suitable delay. The phase plate 7 is a reflective phase plate, which is arranged at a distal end of the optical path delay unit 6 and is perpendicular to an optical axis of the optical path delay unit 6 (a central line of the phase plate 7 coincides with the optical axis of the optical path delay unit 6), and the phase plate 7 is configured to modulate a wavefront and optical path of the depletion light and produce a hollow shell-shaped focal spot on a focal plane of the microscopic objective lens. By using a binary optical processing technology to perform reflective phase control of the depletion light on the phase plate 7, a phase modulated beam with a certain time delay, which is strictly concentric with the excitation light and which is critical in the STED technology (the depletion light is converged by the objective lens to form the shell-shaped light spot), can be produced.

In a specific embodiment, the optical path delay unit 6 and the phase plate 7 may be of an integral structure or a split structure. In a preferred embodiment, the optical path delay unit 6 and the phase plate 7 are arranged as an integral structure, and the phase plate 7 is processed on a surface of an exit end of the optical path delay unit 6. The integrated design makes the arrangement of optical elements more compact, and at the same time, it can reduce the influence of external environment such as temperature and vibration on the light path and improve the reliability of the optical system.

The first light beam 101 is converted into circularly polarized light after passing through the first quarter-wave plate 41, and after being reflected by the first dichroic element 51, it forms linearly polarized light after passing through the first quarter-wave plate 41 again; the linearly polarized light is incident onto the polarization beam splitter 3 and transmitted. The second light beam 102 is converted into circularly polarized light after passing through the first quarter-wave plate 41, then transmitted through the first dichroic element 51 and enters the optical path delay unit 6 to generate optical delay, and is incident onto the phase plate 7 arranged at the distal end of the optical path delay unit 6; the second light beam 102 is wavefront-modulated and reflected by the phase plate 7 and then returns to the incident end of the optical path delay unit 6 along the original light path, and is transmitted through the first dichroic element 51 to the first quarter-wave plate 41 and converted into linearly polarized light which, after being transmitted through the polarization beam splitter 3, recombines with the first light beam 101 at the polarization beam splitter 3. Since the first light beam 101 does not pass through the optical path delay unit 6 and the second light beam 102 passes through the optical path delay unit 6, there will be a fixed pulse time delay between the two, and the recombined first light beam 101 and second light beam 102 are coaxial.

The recombined first light beam 101 and second light beam 102 are respectively reflected by the second dichroic element 52 and then pass through the second quarter-wave plate 42 so that linearly polarized lights are converted into circularly polarized lights, which then enter the microscopic imaging system to be converged and irradiated onto the sample by a focusing objective lens to form concentric light spots. The first light beam 101 is converged and irradiated onto the sample to form a solid light spot; the second light beam 102 is converged and irradiated onto the sample to form a hollow light spot. The first light beam 101 has a different wavelength from the second light beam 102, and after the coaxial transmission by the illumination light path, the first light beam 101 will excite fluorescence on the sample. The above solid light spot overlaps with the above hollow light spot. The solid light spot excites the fluorescent substance on the sample to emit fluorescence, and the hollow light spot suppresses the fluorescence emitted from the periphery of the fluorescent substance, so that only a middle point smaller than the diffraction limit emits fluorescence and is observed. The excited fluorescence is filtered by a third optical filter 9 and then received by the fluorescence detection system 30 for detection.

The first quarter-wave plate 41 converts the light beam reflected by the polarization beam splitter 3 from linearly polarized light into circularly polarized light, and converts the circularly polarized light which is incident for the second time into linearly polarized light before it enters the polarization beam splitter 3 for transmission, thus achieving smooth transmission by the light path. The second quarter-wave plate 42 is used to set the excitation light entering the microscopic imaging system to circularly polarized light, thus obtaining a higher fluorescence excitation efficiency and a better shell-shaped focal spot.

In this embodiment, the polarization beam splitter 3 is connected to the first quarter-wave plate 41, and the first dichroic element 51 is plated on the surface of the optical path delay unit 6 to adjust the polarization properties of the excitation light and the depletion light and the transmission path of the light path; the second dichroic element 52 is connected to the second quarter-wave plate 42 to adjust the polarization state of the recombined excitation light and depletion light and change the propagation direction of light. The combined use of the polarization beam splitter 3 and the wave plates makes the light path compact, which is advantageous for achieving beam steering and beam polarization state control with fewer optical elements; moreover, various main optical elements can be combined into an integrated module by being bonded at end faces, which makes the device insensitive to temperature and environmental vibration while reducing the volumes of the devices, and improves the reliability.

The third optical filter 9 is a fluorescence band-pass optical filter, which is arranged between the microscopic imaging system 20 and the fluorescence detection system 30. The fluorescence emitted from the sample passes through the third optical filter 9 to filter out other lights (including the scattered first light beam 101 and second light beam 102) than the fluorescence, and then enters the fluorescence detection system 30 for data collection. In this embodiment, the third optical filter 9 is arranged on one side of the second dichroic element 52, and the second dichroic element 52 is configured as a lens capable of transmitting fluorescence, thereby ensuring that the fluorescence emitted from the sample directly enters the fluorescence detection system 30 for detection.

Figure 2:
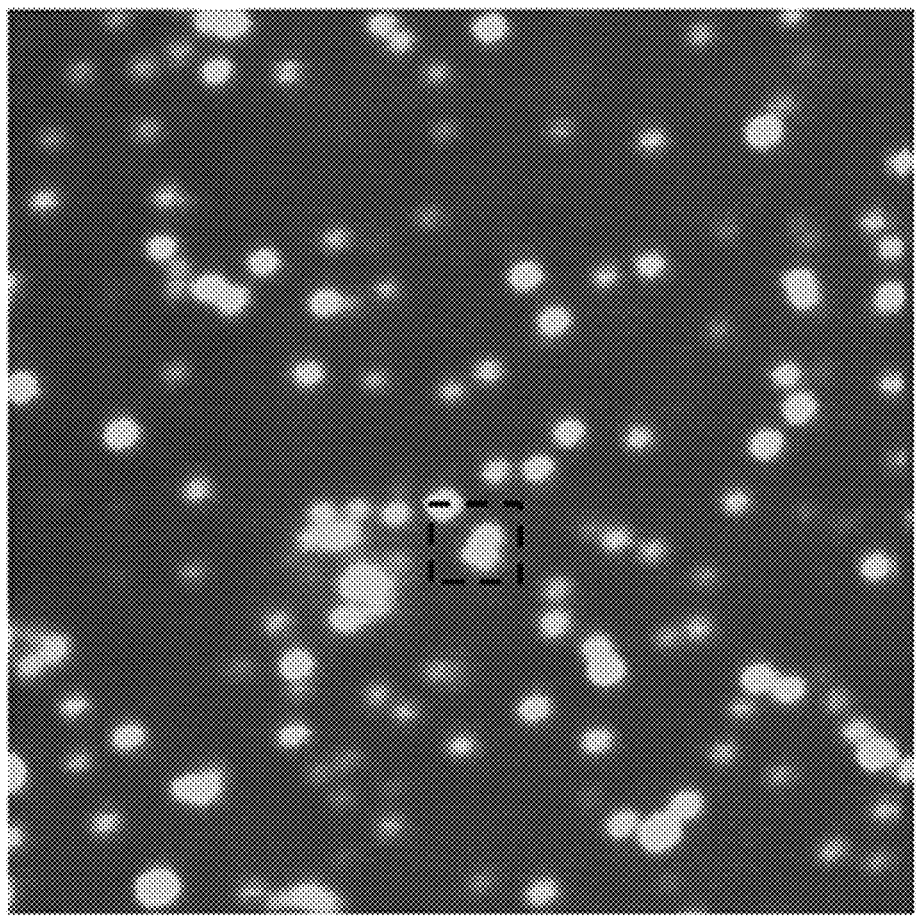
FIG. 2 is a confocal imaging view obtained by irradiating a sample of 40 nm fluorescent microspheres with an existing confocal microscope.
Figure 3:
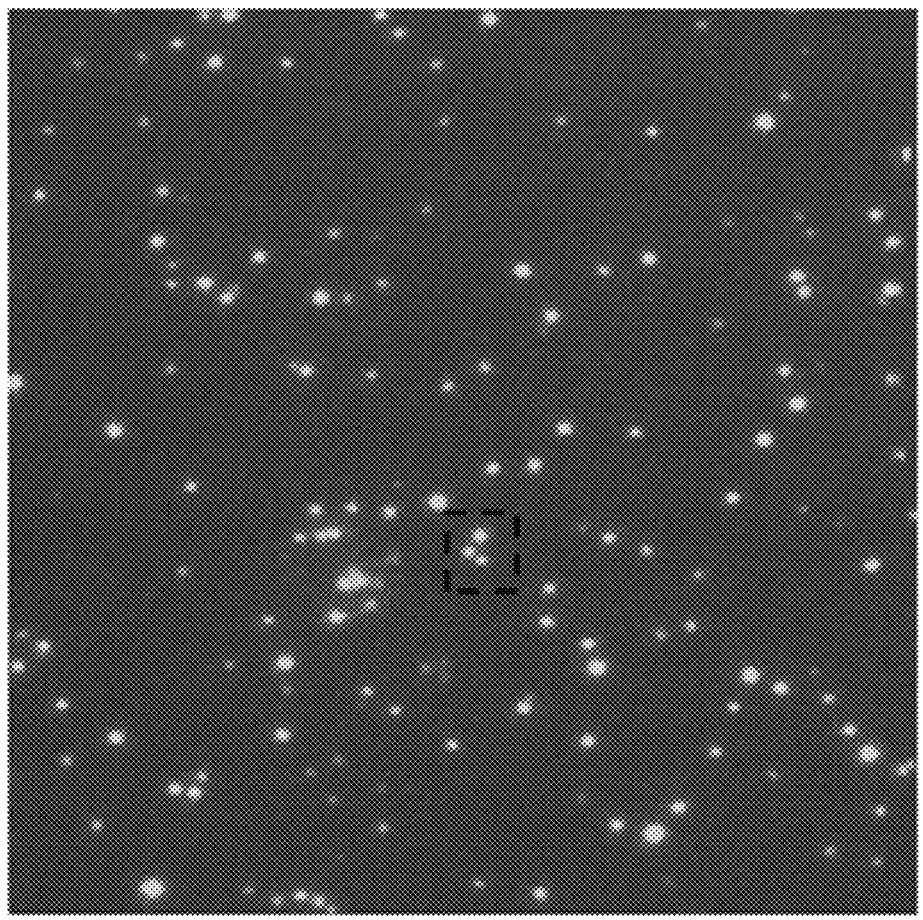
FIG. 3 is a STED imaging view obtained by irradiating a sample of 40 nm fluorescent microspheres in the same area as FIG. 2 with the illumination system for the STED optical microscope provided by the embodiment of the present disclosure.

FIG. 2 is an imaging view obtained by performing confocal imaging test on a sample of 40 nm (diameter) fluorescent microspheres with a traditional confocal microscope, and FIG. 3 is an imaging view obtained by performing stimulated emission depletion (STED) microscopic imaging test on a sample of 40 nm (diameter) fluorescent microspheres in the same area as FIG. 2 with the above STED optical microscope. It can be seen from the drawings that the traditional confocal imaging (in the dashed box in FIG. 2) cannot distinguish nano-microspheres, while the STED super-resolution imaging of the present disclosure (in the dashed box in FIG. 3) can clearly identify three fluorescent microspheres, and the measured full width at half maximum of the microscopic imaging of fluorescent microspheres is less than 50 nm. It can be seen from the above comparison that the illumination system for the STED optical microscope provided by the present disclosure can greatly improve the imaging resolution and obtain the effect of super-resolution imaging.

The present disclosure also provides a STED optical microscope including the illumination system described above. The STED optical microscope further includes a microscopic imaging system 20 and a fluorescence detection system 30, and the microscopic imaging system 20 includes the microscopic objective lens; after passing through an illumination light path of the illumination system, a light beam emitted from the illumination light source is divided into two coaxial light beams, i.e., a first light beam 101 and a second light beam 102; the first light beam 101 and the second light beam 102 are respectively converged by the microscopic objective lens and then irradiated onto a sample to excite fluorescent substance in the sample to emit fluorescence; the fluorescence enters the fluorescence detection system 30 for detection after being converged by the microscopic objective lens; optical axes of the first light beam 101, the second light beam 102 and a detection light path of the fluorescence detection system 30 are all coaxial; and a focal plane of the above microscopic objective lens is perpendicular to each of the optical axes of the first light beam 101, the second light beam 102 and the detection light path of the fluorescence detection system.

Through an integrated optical module design, the illumination system for the STED optical microscope provided by the present disclosure can realize coaxial input and output of the excitation light, depletion light and confocal detection light path, and realize high-precision and long-time stable alignment of the excitation light spot and the STED shell-shaped light spot; at the same time, a physical adjustment of the mutual geometric relationship between unit devices and an inherent temperature and vibration instability of a mechanical adjustment mechanism are avoided, so that the STED instrument can work reliably and stably for a long time in various environments.

It should be pointed out that in the description of the present disclosure, the terms "first" and "second" are only used to distinguish one entity or operation from another entity or operation, and do not necessarily require or imply there exists any such actual relationship or order between these entities or operations.

Described above are only specific preferred embodiments of the present disclosure, but the scope of protection of the present disclosure is not limited to this. Any change or replacement that can be easily contemplated by those skilled in the art within the technical scope disclosed in the present disclosure should be covered within the scope of protection of the present disclosure. Therefore, the scope of protection of the present disclosure shall be accorded with the scope of the claims.

The invention claimed is:

1. An illumination system for a STED optical microscope, the illumination system comprising an illumination light source, and an illumination light path composed of optical elements; after passing through the illumination light path, a light beam emitted from the illumination light source is focused and irradiated onto a sample to excite fluorescent substance in the sample to emit fluorescence; wherein the illumination light path comprises a first optical filter, a second optical filter, a polarization beam splitter, a first quarter-wave plate, a first dichroic element, an optical path delay unit, a phase plate, a second dichroic element and a second quarter-wave plate, which are arranged in sequence in a transmission direction of the light path; after the light beam emitted from the illumination light source is optically filtered by the first optical filter and the second optical filter, a first light beam and a second light beam each having a certain wavelength are obtained; the first light beam and the second light beam are respectively split by the polarization beam splitter to form linearly polarized lights which, after being reflected, are incident onto the first quarter-wave plate and the first dichroic element in sequence; the first light beam forms circularly polarized light after passing through the first quarter-wave plate, and after being reflected by the first dichroic element, it passes through the first quarter-wave plate again to form linearly polarized light, which is then transmitted through the polarization beam splitter, reflected by the second dichroic element, and converted by the second quarter-wave plate into circularly polarized light to be incident onto a microscopic objective lens of a microscopic imaging system and converged, thus forming a first light spot at a focal plane of the microscopic objective lens; the second light beam forms circularly polarized light after passing through the first quarter-wave plate, and after being transmitted through the first dichroic element, it is incident onto the optical path delay unit and the phase plate; after being reflected by the phase plate, the second light beam is sequentially exited from the optical path delay unit, transmitted through the first dichroic element, converted by the first quarter-wave plate into linearly polarized light, transmitted through the polarization beam splitter, reflected by the second dichroic element, converted by the second quarter-wave plate into circularly polarized light, and incident onto the microscopic objective lens of the microscopic imaging system and converged, thus forming a second light spot at the focal plane of the microscopic objective lens, wherein a center of the first light spot coincides with a center of the second light spot.

2. The illumination system for the STED optical microscope according to claim 1, wherein the first light beam is excitation light, and the first light spot is a solid light spot; the second light beam is depletion light relative to the first light beam, and the second light spot is a hollow light spot.

3. The illumination system for the STED optical microscope according to claim 2, wherein the first optical filter is a neutral optical filter configured to adjust an intensity of a total laser light emitted from illumination light source; the second optical filter is a dual-band-pass optical filter configured to filter out the first light beam and the second light beam each having the certain wavelength, and adjust an intensity of the first light beam and an intensity of the second light beam, and wherein the first optical filter and the second optical filter are arranged coaxially along the light path.

4. The illumination system for the STED optical microscope according to claim 2, wherein the polarization beam splitter is capable of separating the incident light beam into two beams of linearly polarized light, polarization directions of which are perpendicular to each other, and which are reflected and transmitted respectively.

5. The illumination system for the STED optical microscope according to claim 2, wherein the first quarter-wave plate is capable of converting the incident first light beam and second light beam from linearly polarized light into circularly polarized light, and is also capable of converting the incident first light beam and second light beam from circularly polarized light into linearly polarized light; the second quarter-wave plate is capable of converting linearly polarized light into circularly polarized light.

6. The illumination system for the STED optical microscope according to claim 2, wherein the first dichroic element is a selective transmission medium film, the medium film is plated on an incident end of the optical path delay unit, and the medium film is capable of reflecting the incident first light beam and is capable of transmitting the incident second light beam; the second dichroic element is a dichroic sheet, and the dichroic sheet is capable of reflecting both the incident first light beam and second light beam and is capable of transmitting the fluorescence emitted from the sample.

7. The illumination system for the STED optical microscope according to claim 2, wherein the optical path delay unit is capable of causing optical delay in the second light beam.

8. The illumination system for the STED optical microscope according to claim 7, wherein the phase plate is a reflective phase plate, which is arranged at a distal end of the optical path delay unit; the second light beam enters the optical path delay unit and is then incident onto the phase plate; after being reflected, the second light beam can return to an incident end of the optical path delay unit along the original light path; in addition, the phase plate is capable of modulating a wavefront of the incident second light beam.

9. The illumination system for the STED optical microscope according to claim 1, wherein a beam expander for expanding and shaping the light beam emitted from the illumination light source is further provided between the illumination light source and the first optical filter.

10. A STED optical microscope, comprising the illumination system for the STED optical microscope according to claim 1, wherein the STED optical microscope further comprises a fluorescence detection system; after passing through the illumination light path of the illumination system, the light beam emitted from the illumination light source is divided into two coaxial light beams, i.e., a first light beam and a second light beam; the first light beam and the second light beam are respectively converged by the microscopic objective lens and then irradiated onto a sample to excite fluorescent substance in the sample to emit fluorescence; the fluorescence enters the fluorescence detection system for detection after being converged by the microscopic objective lens; an optical axis of the first light beam and an optical axis of the second light beam are both coaxial with an optical axis of a detection light path of the fluorescence detection system.

* * * * *